(12) United States Patent
Bandemer et al.

(10) Patent No.: US 6,885,783 B2
(45) Date of Patent: Apr. 26, 2005

(54) DEVICE FOR DETECTING THE PMD OF OPTOELECTRONIC TRANSMISSION LINES

(75) Inventors: Adalbert Bandemer, Herrsching (DE); Egbert Krause, Burgstaedt (DE)

(73) Assignee: Thorlabs GmbH, Karlsfeld (DE)

( * ) Notice: Subject to any disclaimer, the term of this patent is extended or adjusted under 35 U.S.C. 154(b) by 57 days.

(21) Appl. No.: 10/204,812

(22) PCT Filed: Mar. 5, 2001

(86) PCT No.: PCT/DE01/00814
§ 371 (c)(1),
(2), (4) Date: Oct. 30, 2002

(87) PCT Pub. No.: WO01/67649
PCT Pub. Date: Sep. 13, 2001

(65) Prior Publication Data
US 2003/0108267 A1 Jun. 12, 2003

(30) Foreign Application Priority Data
Mar. 4, 2000 (DE) .......................... 100 10 677

(51) Int. Cl.$^7$ ................................................ G02B 6/00
(52) U.S. Cl. ................................ 385/11; 385/3; 398/13
(58) Field of Search ...................... 385/11, 1–3, 26–28, 385/37; 356/484, 477; 398/185, 65, 81, 84, 44, 13

(56) References Cited

U.S. PATENT DOCUMENTS 5,473,457 A * 12/1995 Ono .......................... 398/185
5,896,211 A    4/1999 Watanabe
6,271,922 B1 * 8/2001 Bulow et al. ................ 356/477
6,563,590 B1 * 5/2003 Chowdhury et al. ........ 356/484

FOREIGN PATENT DOCUMENTS

| EP | 0 271 934 A1 * | 11/1987 | ............ H04B/9/00 |
| EP | 0 260 745 A | 3/1988 | |
| EP | 0 964 237 A | 12/1999 | |
| WO | WO 00/77956 A | 12/2000 | |

OTHER PUBLICATIONS

Okoshi, T. et al., "New Polarization–Control Scheme for Optical Heterodyne Receiver Using Two Faraday Ratators," Electronic Letters, GB, IEE Stevenage, 21(18), pp. 787–788 (Aug. 29, 1985).

Rosenfeld et al., "PMD Compensation in 10 Gbit/s NRZ Field Experimental Using Polarmetric Error Signal," *Electronic Letters*, vol. 36, No. 5 (Mar. 2000).

Calvani et al., "Real–Time Heterodyne Fiber Polarimetry with Narrow– and Broad–Band Sources," *Journal of Lightwave Technology*, vol. LT–4, No. 7 (Jul. 1986).

* cited by examiner

*Primary Examiner*—Daniel Stcyr
*Assistant Examiner*—Daniel A. Hess
(74) *Attorney, Agent, or Firm*—Finnegan, Henderson, Farabow, Garrett & Dunner

(57) ABSTRACT

The invention relates to a device for detecting the PMD of optoelectronic transmission lines. The inventive device is characterized in that it comprises a narrow-band, tunable laser, whose illumination is superimposed with the illumination of the transmission line to be analyzed and an optoelectronic heterodyne receiver which receives the superimposed signal.

6 Claims, 3 Drawing Sheets

DEVICE FOR DETECTING THE PMD OF OPTOELECTRONIC TRANSMISSION LINES

TECHNICAL FIELD

The invention relates to a device for detecting the polarization mode dispersion (hereinafter PMD) of optoelectronic transmission links.

PRIOR ART

A known method for determining the distortions caused by polarization mode dispersion (PMD) in optical communication links such as fiber lines, or the effects thereof on the transmission quality of such links, respectively, is the measurement of the bit error rate. This method provides a statement about the effect of the PMD, but no statements about the magnitude of the PMD itself.

Another known method for determining the PMD uses a set of high frequency filters after the optoelectronic detection of the usable signal in order to determine the phase shifts of selected side frequencies. Therein, the effort depends on the modulation bandwidth of the usable signal. Different bit rates in the digital transmission require different filter combinations. Usually, only ca. 3–4 filters are feasible. The determination of the PMD is associated with a signal demodulation and only possible for each one usable signal.

On the other hand, there exists a substantial commercial interest in the determination of the PMD, for example to be able to compensate for this by means of appropriate compensating means.

DISCLOSURE OF THE INVENTION

The invention is based on the object to provide an assembly for determining the PMD, which allows in short measurement time a conclusion to the variations of the PMD, such that it is for example and especially usable as a component of a PMD compensating means.

A solution to this object according to the invention is set out in claim 1. Further developments of the invention are the subject of the dependant claims.

The invention relates to a method and an assembly for measuring the polarization mode dispersion in optical communication links.

The spectrum of a digital optical data signal has a defined spectral width depending on the bit rate. The higher the bit rate, the wider the associated spectrum.

The different propagation velocities of the different spectral portions having different polarization states within the light guide fiber of the transmission link cause signal distortions after sufficient transmission length, which make a recovery of the digital information impossible or at least adversely affect the signal quality.

By means of an optoelectronic heterodyne receiver, the bandwidth of which is a fraction of the signal spectrum, this spectrum is measured spectrally resolved. Then, measured values are obtained that reflect the power density spectrum of the received signal.

With this optical superposition, the usable amplitude of the electrical superposition signal depends on the two signal powers, but also directly on the polarization directions of the incoming signal and of the local superposition laser.

In order to determine the polarization-independent power density of the input spectrum, two orthogonal polarization states (SOP=state of polarization) e.g. of the local laser are used for optoelectronic superposition. E.g., these can be the horizontal and vertical polarization having the vectors $(S_1, S_2, S_3) = (1, 0, 0); (-1, 0, 0)$.

$SOP_H = (1, 0, 0)$ horizontal $SOP_V = (-1, 0, 0)$ vertical

The spectral distribution of the total signal power is determined using these two orthogonal polarization states.

$P_{Uges}(\lambda) = (P_{UH}(\lambda) + P_{UV}(\lambda))/2$

In order to be able to measure the different polarization states within the received spectrum spectrally resolved, further polarization directions are required. Therein, it is advantageous to use a polarization at 45 degrees and a right-handed or left-handed circular polarization, e.g.

$SOP_{+45} = (0, 1, 0)$ linear, +45° oblique $SOP_R = (0, 0, 1)$ right-handed circular Now, the input spectrum is superimposed on the proposed polarization states of local laser:

(S1, S2, S3)

$SOP_H = (1, 0, 0)$ horizontal $SOP_V = (-1, 0, 0)$ vertical $SOP_{+45} = (0, 1, 0)$ linear, +45° oblique $SOP_R = (0, 0, 1)$ right-handed circular The power of each mixed product is proportional to the product of input power and local laser power and a factor of k describing the correspondence of both polarizations.

$P_u = k \cdot P_E \cdot P_L \cdot a(\Delta SOP)$

K constant
$P_E$ input power
$P_L$ local laser power
$a(\Delta SOP)$ polarization correspondence factor Therein, the polarization correspondence factor $a(\Delta SOP)$ depends on the relative distance of the SOP on the Poincaré sphere:

$a(\Delta SOP) = \cos^2(\alpha/2)$ $\alpha$ angle between $SOP_E$ and $SOP_L$ on the Poincaré sphere The amplitude factor $a(\Delta SOP)$ is maximally 1 with identical polarizations ($\alpha = 0°$) and 0 for orthogonal polarizations ($\alpha = 180°$).

By means of the three polarizations $(S_1, S_2, S_3) = (1,0,0); (0,1,0); (0,0,1)$ representing the Stokes vectors $S_1, S_2, S_3$, from that the wavelength-dependent normalized Stokes parameters $S_1(\lambda)$, $S_2(\lambda)$ and $S_3(\lambda)$ of the received signal are determined:

$S_1(\lambda) = P_{UH}(\lambda)/P_{Utot}(\lambda)$ $S_2(\lambda) = P_{U+45}(\lambda)/P_{Utot}(\lambda)$ $S_3(\lambda) = P_{UV}(\lambda)/P_{Utot}(\lambda)$ Thus, at each wavelength of the input spectrum the polarization direction of the filtered-out spectral portion is determined.

$SOP_E(\lambda) = [S_1(\lambda), S_2(\lambda), S_3(\lambda)]$

The PMD now shows its effects in that the radiation of the data source is split into two power components corresponding to the principal states of polarization {PSP$_{in}$} at the input of the transmission link. Between the two power components, usually of different magnitude, a relative time delay, termed differential group delay {DGD}, occurs. The two power components reach the PMD monitor designed according to the invention with polarization directions corresponding to the PSP$_{out}$.

The data signal does not experience any distortions by PMD, if the DGD is equal to 0, or the polarization of the input radiation is identical to a PSP$_{in}$ of the transmission link. In both cases the output polarization at the end of the transmission link remains constant, even if the wavelength slightly varies.

$$SOP_E(\lambda)=\text{const.}$$

The different spectral portions of the signal have the same polarization, their accumulated polarization variation across the spectrum is equal to 0.

However, the greater the DGD is, and the closer the power division ratio to the two PSP$_{in}$ approaches the value 1:1, the more the input signal is distorted:

$$SOP_E(\lambda)=\text{variable}$$

The measurement data SOP$_E$($\lambda$) are present for the relevant wavelength range from the preceding calculations. These data are sufficient to perform the determination of the PMD according to the Poincaré (arc angle) method. Therein, at each point of the graph the differential quotient from SOP$_E$($\lambda$)−SOP$_E$($\lambda$+δ$\lambda$) is formed on the Poincaré sphere and the associated wavelength section δ$\lambda$. For computation-technical reasons, here the changeover to discrete steps can be advantageous.

$$\Delta\tau(\lambda_1)=\Delta\Omega * \lambda_0^2 / 2\pi * C * \alpha\lambda$$

$$\Delta\Omega = \text{arc}(SOP_E(\lambda_i), SOP_E(\lambda_{i+1}))$$

$$\lambda_0 = (\lambda_i + \lambda_{i+1})/2$$

$$\Delta\lambda = \lambda_{i+1} - \lambda_i$$

Δτ DGD in ps
ΔΩ arc on the Pointcaré sphere

The now present individual values Δτ($\lambda_1$) are usefully combined to a root mean square value which is a reliable measure of the PMD distortion:

$$\langle\Delta\tau\rangle = \sqrt{\frac{1}{n}\int_{i=1}^{n}\Delta\tau^2(\lambda_i)}$$

Over the known solutions of the conventional PMD measuring devices, which operate either according to the interferometric method or according to the Jones matrix method and require from some ten seconds to a few minutes per measurement, which are very bulky and which operate with components to be moved during the measurement, the solution according to the invention has the advantage of detecting the variations of the PMD of e.g. fiber lines virtually in real-time. The assembly according to the invention further allows the calculation of the wavelength-dependent Stokes parameters. By the use of the quickly and optionally tunable local laser and the use of quickly responding polarization controllers, the construction of a PMD monitor is possible, which operates in optionally selectable subranges within the entire wavelength range with different resolutions. Moreover, it is a solution with small construction size as well as a solution without moved components, so that real-time PMD monitoring systems with particularly long life can be realized.

BRIEF DESCRIPTION OF THE DRAWINGS

The invention in described in greater detail below by way of embodiments with reference to the drawing, in which there show.

PRESENTATION OF EMBODIMENTS

Figure 1:
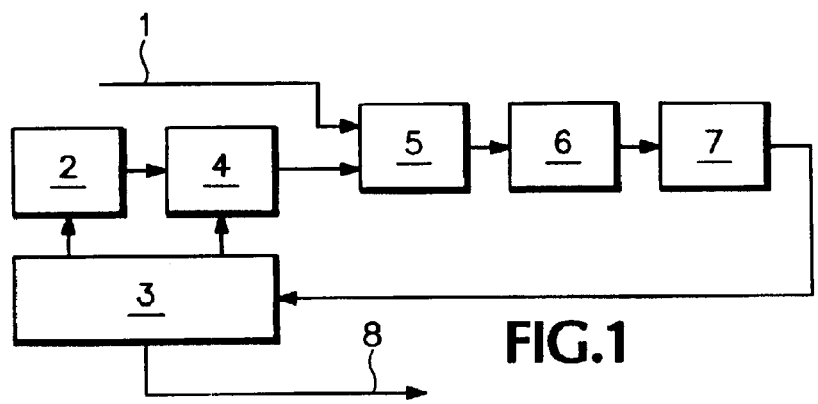
FIG. 1 a schematic embodiment of a device according to the invention for measuring the PMD, FIG. 2 a variation of the embodiment shown in FIG. 1 with a balance mixer, FIG. 3 a variation of the embodiment shown in FIG. 2 with a polarization controller, FIG. 4 an embodiment with polarization diversity receiver and balance mixer, FIG. 5a schematically the representation of the spectral power distribution of a data signal, FIG. 5b the wavelength dependence of the polarization states for a signal without PMD distortions, FIG. 5c the wavelength dependence of the polarization states in case of presence of high PMD distortions, FIG. 6 an embodiment of the piezoelectric polarization controller of the PMD monitor, and FIG. 7 a PMD monitor according to the invention as the central component of a PMD compensator.

FIG. 1 schematically shows a first embodiment of a device according to the invention for measuring the PMD, hereinafter also referred to as PMD monitor. A local, tunable laser (2), advantageously an electronically tunable distributed Bragg reflector laser (DBR laser) or an electronically tunable distributed feedback laser (DFB laser), is tuned by a control unit (3) such that the wavelength range of tuning sweeps the spectrum of a signal (1) of a transmission link to be analyzed. The polarization of the local laser (2) is set to the four different polarization states required for determining the PMD by means of a polarization controller (4). In an optical coupler (5) that conveniently is a 3 dB coupler, the signal (1) to be analyzed is added to the radiation of the local laser (2).

In the succeeding optoelectronic receiver (6), advantageously a photodiode, an electrical superposition signal is generated. A HF filter and evaluation unit (7) limits the bandwidth of the superposition signal, filters out undesired base band signals and makes available the measurement signal of the succeeding control and calculation unit (3). This one analyzes the behavior of the measured quantity at the various polarizations and wavelengths of the local laser (2). As a result of these calculations a 10 control signal (8) is generated, which is proportional to the PMD distortion of the input signal (1) to be analyzed and which is suitable for the control of a PMD compensator unit. The advantage of such an assembly with an electronically tunable semiconductor laser is that the tuning to the different frequencies firstly can be effected very quickly, and secondly with selectable tuning slope, and thus regions with increased information density can be treated with increased resolution. This is desirable with respect to a smart monitor.

Figure 2:
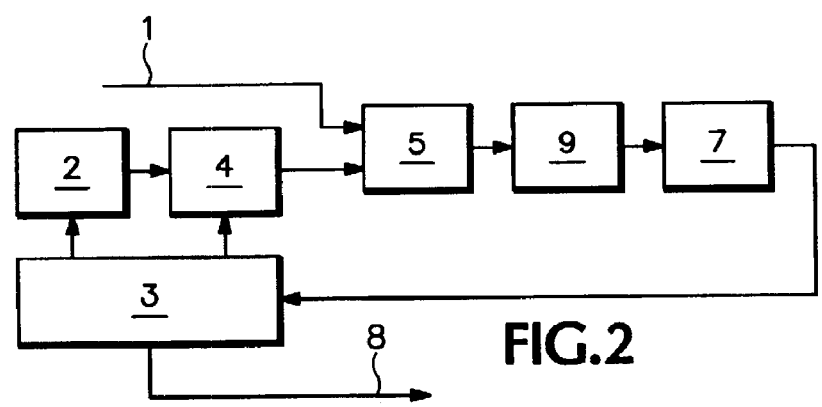

In the configuration of FIG. 2 the optoelectronic receiver is replaced by an optoelectronic balance receiver (9) in which the base band portions of the optical signals are widely suppressed. This configuration is characterized by a higher dynamic range.

Figure 3:
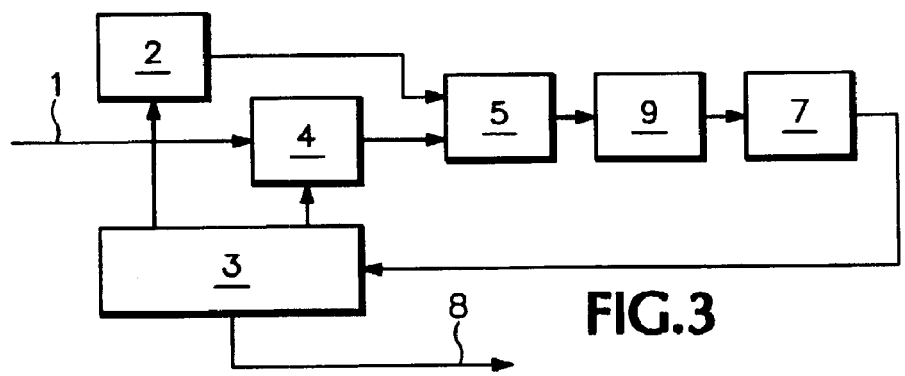

In a third configuration of FIG. 3, providing the required different polarization states for the optoelectronic superposition can be achieved by disposing the polarization controller (4) not in the branch of the local laser (2), but in the branch of the input signal (1).

Figure 4:
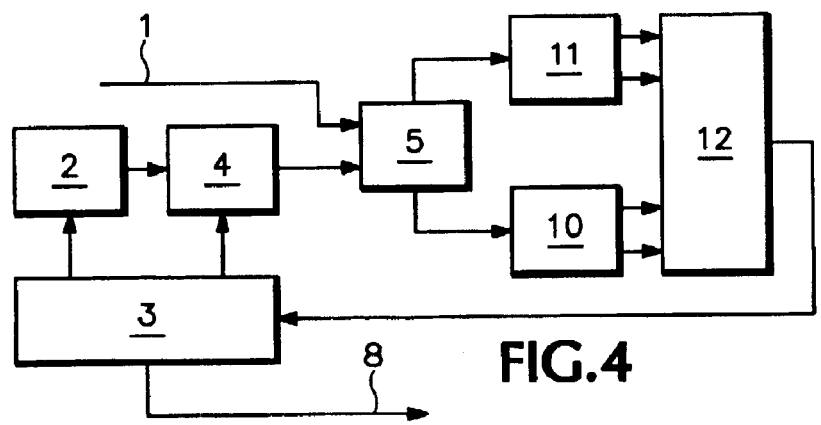

By way of example, in a configuration of FIG. 4 switching the polarization states is avoided by using a polarization diversity receiver (12) containing beam splitters (10, 11) with polarization filter properties.

Figure 5A:
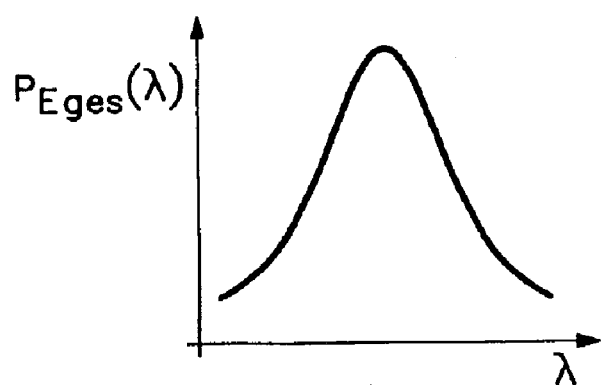

FIG. 5a schematically shows the representation of the spectrum $P_{Etot}(\lambda)$ of the input signal.

Figure 5B:
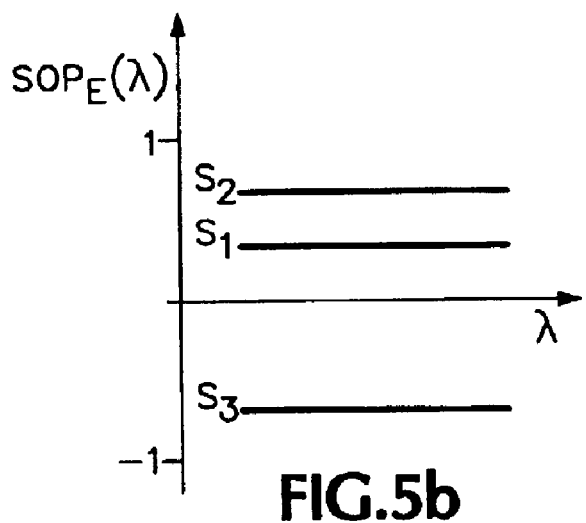

FIG. 5b shows the polarization constancy over the relevant wavelength range in case of absent PMD and in case of completely compensated PMD, respectively.

Figure 5C:
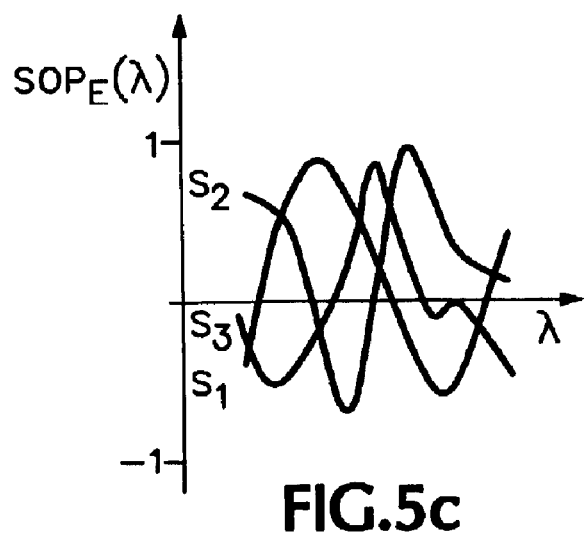

In FIG. 5c the behavior of different polarizations of the spectral portions in case of high PMD is shown.

Figure 6:
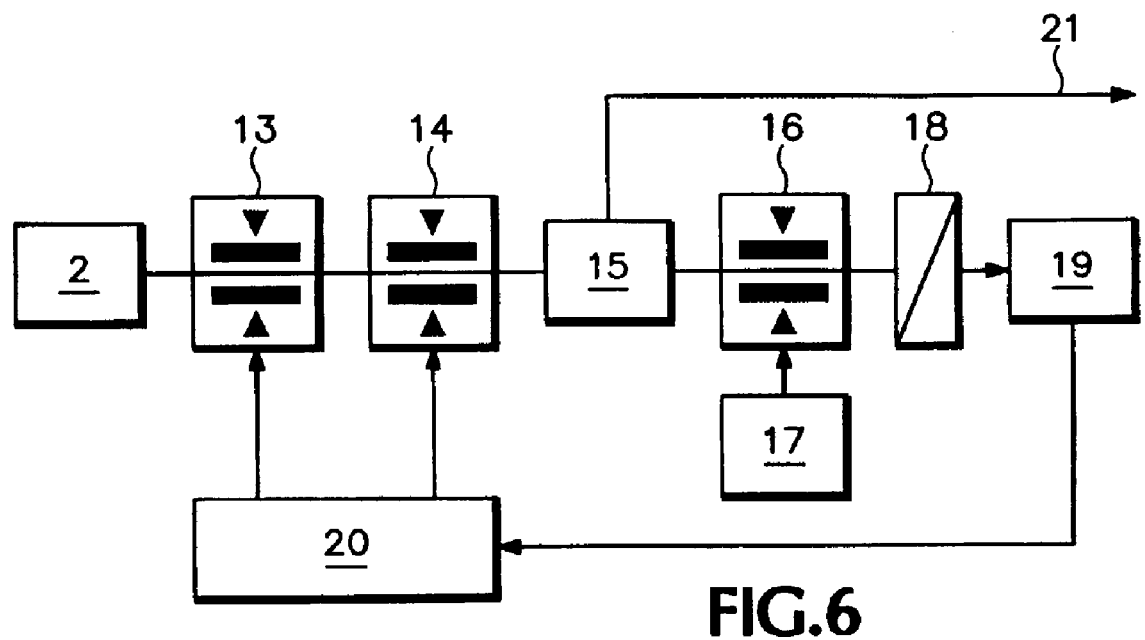

In FIG. 6 the schematic construction of the polarization controller (4) within the PMD monitor is shown in a configuration of fiber squeezers with piezo elements. The light of the local laser (2) can be brought in any starting polarization by means of two piezo fiber squeezers (13) and (14) disposed mutually rotated by 45°. A fiber coupler (15) provides the main portion of the total power at the output (21) and extracts a small portion for the polarization control. A further piezo fiber squeezer (16) is modulated by a signal generator (17). The polarizer (18) is mounted rotated by 45° with respect to the piezo fiber squeezer (16). The light modulated in its polarization direction experiences amplitude modulation by the polarizer (18), which is analyzed by the optical receiver (19). The measured signal reflecting the modulation amplitude enters the evaluation and control unit (20).

The two piezo fiber squeezers (13) and (14) are driven such that the modulation amplitude at the receiver (19) becomes zero. This is the case, if the polarization at the piezo fiber squeezer (16) is set exactly horizontally or vertically (intrinsic modes of the birefringent fiber element). Due to the intrinsic birefringence of connecting fibers and coupler (15), at the output (21) of the assembly there arise two varied polarizations, which, however, are unchanged in their orthogonality with respect to each other.

For achieving the horizontal (1,0,0) or vertical (−1,0,0) polarization, respectively, at the piezo fiber squeezer (16), two defined control voltages are each required for the piezo fiber squeezers (13) and (14). If these voltages are known, by mathematical derivations the required control voltages for the polarizations 45° oblique (0,1,0) and right-handed circular (0,0,1) can be calculated.

For the embodiment of the monitor of FIG. 1, the evaluation and control unit (20) successively drives to the respective 4 control voltages for the piezo fiber squeezers (13) and (14) and thus generates the 4 required polarizations for determining the Stokes parameters according to the described method.

Figure 7:
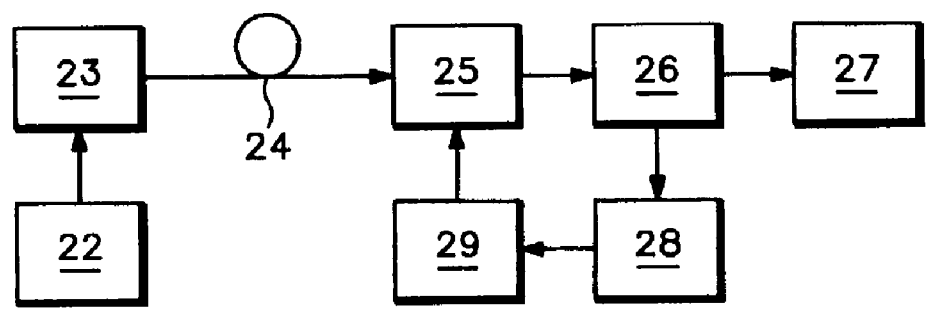

By way of example, FIG. 7 shows the application of the PMD monitor as the central component of a PMD compensator in an optical transmission system for high data rates. The signal of the transmitting laser (23) modulated by a data source (22), in this example reaches the location at which the Stokes parameters are to be determined, through a transmission link (24), in this example this is to be at the receiving location. A PMD compensating unit (25), there arranged preceding the demodulator, will compensate for the PMD of the transmitting fiber (24) upon drive from the control unit (29). For this, a small portion of the usable signal, which is analyzed in the PMD monitor (28), is extracted by means of a coupler (26) before the signal reaches the demodulator (27). The output signal of the PMD monitor (28) controls the PMD compensator via the control unit (29).

We claim:

1. A device for detecting polarization mode dispersion (PMD) in an optoelectronic transmission link comprising:
    a narrow-band tunable laser for providing a local optical signal that is sequentially adjusted to at least four different polarizations and tuned in wavelength within a range of wavelengths;
    means for superimposing the local optical signal on a digital optical signal from the optoelectronic transmission link to produce a superimposed optical signal;
    and an optoelectronic heterodyne receiver for receiving the superimposed optical signal and producing a measure of the PMD in the optoelectronic transmission link based on the polarizations and wavelengths of the local optical signal;
    wherein the optoelectronic heterodyne receiver further comprises a control and evaluation unit for calculating the measure of PMD from an electronic signal derived from the superimposed optical signal as a function of detected intensity of missed products for the various polarizations of the superimposed optical signal with respect to each other depending upon the wavelength of the narrow-band tunable laser.

2. The device as recited in claim 1 wherein the narrow-band tunable laser comprises a laser selected from the group consisting of an electrically tunable distributed Bragg reflector (DBR) laser and an electronically tunable distributed feedback (DFB) laser.

3. The device as recited in claim 1 wherein the superimposing means comprises a polarization controlled for receiving an optical signal selected from the group consisting of the local optical signal and the digital optical signal with respect to a polarization of the non-selected optical signal prior to superimposing the local optical signal on the digital optical signal.

4. The device as recited in claim 3 wherein the polarization controller comprises a piezoelectric controller.

5. The device as recited in claim 1 wherein the optoelectronic heterodyne receiver comprises a receiver selected from the group consisting of a non-linear optoelectronic receiver, a photodiode, a balance receiver and a polarization diversity receiver.

6. The device as recited in claim 1 further comprising means for compensating for the PMD in the optoelectronic transmission link as a function of the measure of PMD.

* * * * *

UNITED STATES PATENT AND TRADEMARK OFFICE
CERTIFICATE OF CORRECTION

PATENT NO.   : 6,885,783 B2
DATED        : April 26, 2005
INVENTOR(S)  : Bandemer et al.

It is certified that error appears in the above-identified patent and that said Letters Patent is hereby corrected as shown below:

Column 6,
Line 29, replace the paragraph starting with words "wherein the optoelectronic heterodyne receiver ..." with the following paragraph:
-- wherein the optoelectronic heterodyne receiver further comprises a control and evaluation unit for calculating the measure of PMD from an electronic signal derived from the superimposed optical signal as a function of detected intensity of mixed products for the various polarizations of the superimposed optical signal with respect to each other depending upon the wavelength of the narrow-band tunable laser; --

Signed and Sealed this

Twelfth Day of July, 2005

JON W. DUDAS
*Director of the United States Patent and Trademark Office*